March 5, 1974  A. BOUNIOT  3,795,643
PROCESS FOR THE CONTINUOUS PRODUCTION OF METHOXY ALDEHYDES
Filed March 25, 1971  3 Sheets-Sheet 1
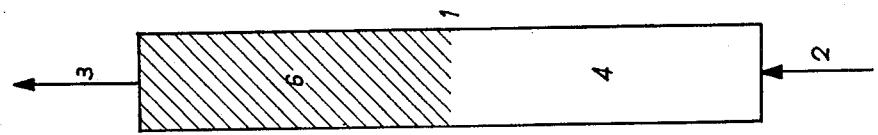
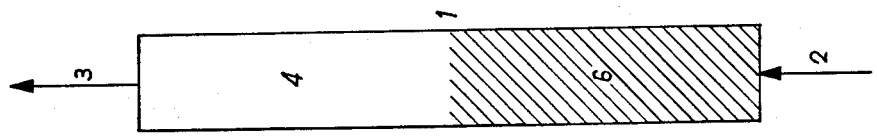
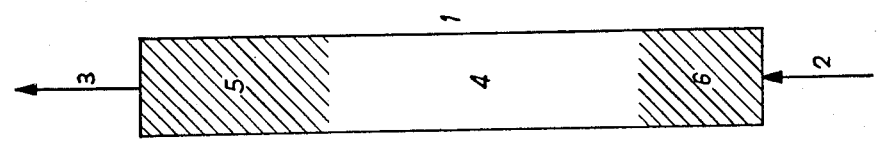
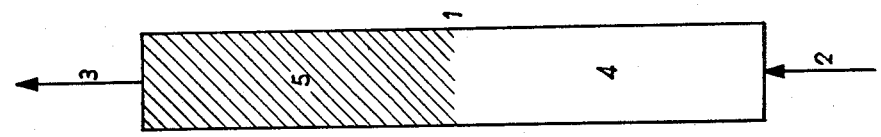
INVENTOR.
ALBERT BOUNIOT
BY
M'Dougall, Hersh-Scott ATTYS

United States Patent Office 3,795,643
Patented Mar. 5, 1974

3,795,643
PROCESS FOR THE CONTINUOUS PRODUCTION
OF β-METHOXY ALDEHYDES
Albert Bouniot, Melle, Deux-Sevres, France, assignor to
Melle-Bezons, Melle, Deux-Sevres, France
Filed Mar. 25, 1971, Ser. No. 128,016
Claims priority, application France, Apr. 30, 1970,
7015829
Int. Cl. C07c 47/18
U.S. Cl. 260—602                                25 Claims

ABSTRACT OF THE DISCLOSURE

The preparation of β-methoxy aldehyde by catalytic condensation of methanol with an α,β-olefinic aldehyde having from 4 to 5 carbon atoms using a slaked lime catalyst on an adsorbent carrier through which the liquid mixture is passed.

---

Figure 5:
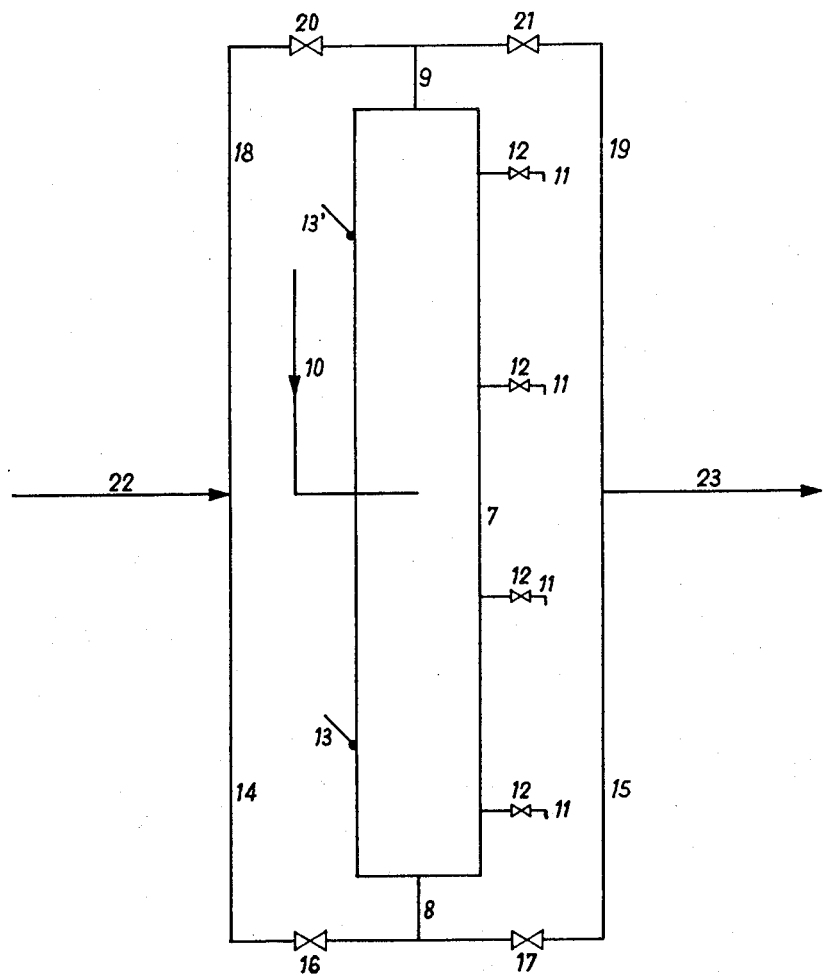

This invention relates to a process for the production of β-methoxy aldehydes.

It is known that when an alkanol is condensed on the olefinic double bond of an α,β-olefinic aliphatic aldehyde, a β-alkoxy aldehyde is formed in accordance with the following equation:

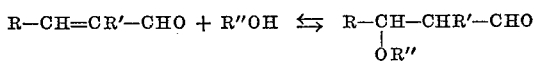

in which R and R' are hydrogen or aliphatic radicals and R" is an alkyl radical.

This addition reaction can be catalyzed by the presence of alkaline reagents. However, when one starts with a lower olefinic aldehyde, such as acrolein or methacrolein, in order to avoid undesirable polymerization reactions, it is important not to make use of a reaction medium or mixture which is strongly alkaline. It is for this reason that use is made either of a strong alkaline reagent, such as sodium hydroxide, which is highly diluted, or buffered by the presence of a buffering agent such as an amine salt, or a weak alkaline reagent, such as an alkali metal carbonate or an amine, and to carry out the reaction at low temperature.

After reaction under these conditions and prior to separating the reaction products one from another, as by distillation, it is necessary to neutralize the alkaline condensation agent to avoid reversal of the reversible reaction. The salts produced by the neutralization concentrated in the lower portion of the distillation column operate partly to destroy the desired alkoxy aldehyde with the formation of polymers. This inconvenience is obviated to some extent by the use of very low contact time vaporizers at the foot of the column.

To avoid the presence of such salts, it has been proposed to employ ion exchangers, either to catalyze the condensation reaction or to neutralize the alkaline condensation agent. Unfortunately, the active life of such ion exchangers is generally short, especially when one starts with an aldehyde, such as acrolein or methacrolein, which produce polymerized reaction products that tend to clog the pores of the ion exchangers.

It has been proposed to use, as a condensation catalyst, a volatile tertiary amine which can be easily separated from the reaction products. Because of the low alkaline reaction of such amines, the reaction speed is sufficient only when the starting aldehyde is acrolein.

It is an object of this invention to provide a process which permits the aforementioned inconveniences to be overcome and permits an easy distillation to the absence of salts, which makes use of low cost catalyst, characterized by satisfactory activity and long active life.

It is a further object of this invention to provide a process of the type described which can be carried out at ambient temperature, without the necessity to add or remove heat, and it is a still further object of this invention to provide a process which embodies methanol condensation with an α,β-olefinic aldehyde having 4 to 5 carbon atoms, other than acrolein which polymerizes too readily to polymers or a higher aldehyde having more than 5 carbon atoms or alcohols higher than methanol because the chemical activity of these substances is too low.

These and other objects and advantages of this invention will hereinafter appear and for purposes of illustration, but not of limitation, embodiments of the invention are shown in the accompanying drawings in which—

Figure 7:
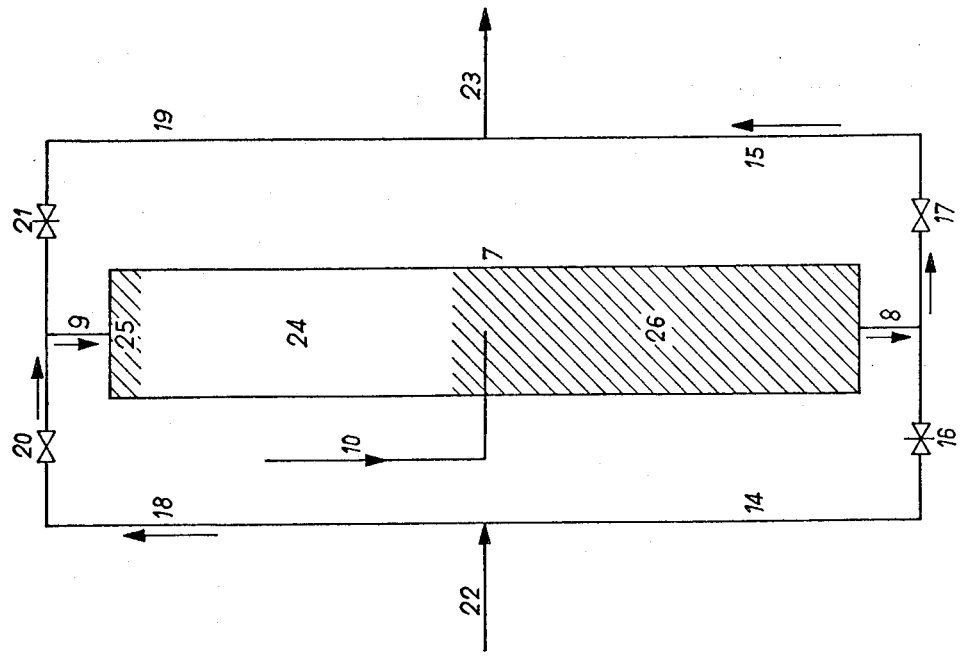
Figure 6:
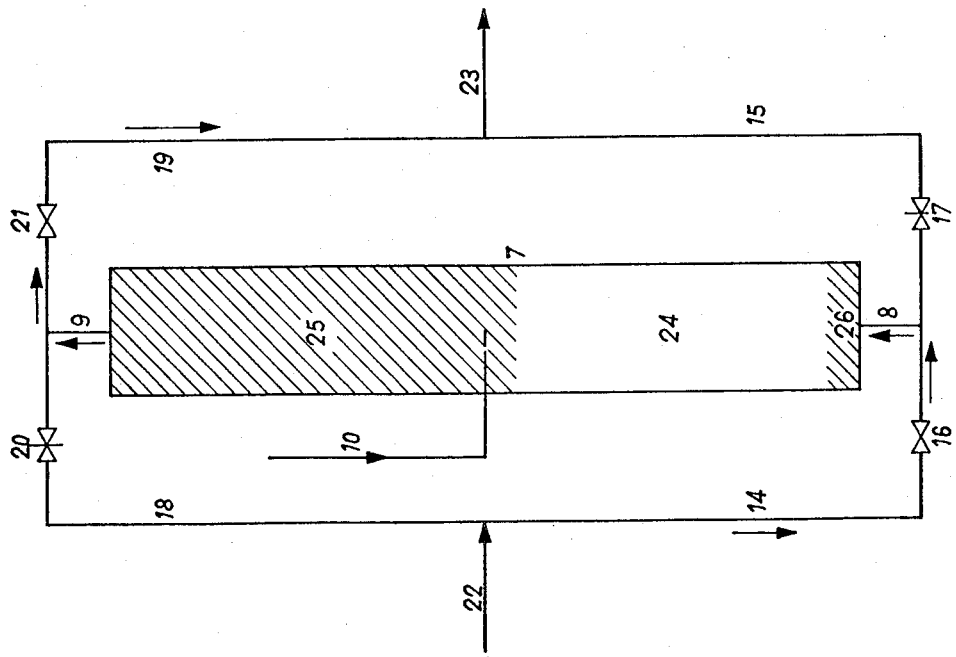

FIGS. 1 to 4 are sectional elevational views through the column of catalyst during various stages of the reaction, and FIGS. 5 to 7 are schematic views of flow diagrams during the progress of the reaction.

In accordance with the practice of this invention, a continuous process for condensation reaction of an α,β-olefinic aliphatic aldehyde having 4 to 5 carbon atoms with methanol, to produce a β-methoxy aldehyde, is carried out by passing a liquid mixture of the reactants over and through a fixed bed catalyst formed of calcium hydroxide deposited on an adsorbing carrier. The term "fixed bed" is meant to refer to a bed which is not in a fluidized condition during liquid flow. Representative of the α,β-olefinic aliphatic aldehydes which may be used as a reactant are croton aldehyde, ethacrolein, methacrolein and the like.

In the preferred practice of this invention, the process is carried out at ambient temperature. The adsorbing carrier is preferably in the form of grains having a grain size of 0.5 to 10 mm. and preferably an average grain size of 2 to 5 mm. in maximum cross-section. Use is advantageously made of adsorbent particles of silica, preferably having a large specific area, especially a silica known commercially as "Aerosil" having a specific area of at least 200 square meters per gram, such as "Aerosil 200" or "Aerosil 380."

The carrier grains may be prepared in the following manner: An amount of carrier, preferably "Aerosil" silica, is mixed with an amount of water sufficient to form a thick paste. The paste is dried for several hours in a drying chamber at a temperature of about 100° C., the dried product is ground and the particles are sifted to separate grains of the desired size.

In preparation of the catalyst in accordance with the practice of this invention, it is sufficient to bring the adsorbing carrier, preferably in the form of grains, into contact with a diluted slaked lime wash. It is desirable that the liquid throughout which the slaked lime is dispersed in the lime wash is other than water, first because the comparatively high solubility of lime in water hinders the deposition of the lime on the carrier from taking place under favorable conditions and with satisfactory results, and secondly because water splits or cracks carriers such as "Aerosil" and "Silicagel." As a result, it is preferred to make use of a lime wash formed of slaked lime dispersed throughout an inert organic liquid having a low boiling point, such as a low boiling alkanol, dialkyl ether or hydrocarbon. It is particularly desirable to make use of methanol, since methanol is a reactant in the condensation reaction. The amount of calcium hydroxide in the lime wash may range within 5–30% by weight and preferably of the order of about 10% by weight.

It has been found that when a liquid mixture of the olefinic aldehyde and methanol is passed through a tube or column filled with the catalyst of this invention, the desired reaction takes place with the simultaneous elution of some of the lime deposited on the carrier with the result that the mixture of the reaction products issuing from the tube or column may contain a small amount of lime. If the operation is continued, the original lime is progressively withdrawn beginning with the lime on the carrier situated at the end of the tube which functions as the entrant end for the mixture of reactants.

This inconvenience can be easily overcome by providing a bed of adsorbing carrier free of lime downstream of the catalyst bed, preferably within the same tube or column. As a matter of fact, the entrainment of the lime by the liquid reaction mixture is an actual chromatographic phenomenon and the lime which is eluted by the liquid at the entrance of the tube is redeposited on the carrier particles which are downstream thereby continuously to reconstitute the catalytic bed which progressively travels along the tube.

FIGS. 1–3 of the drawings illustrate how this phenomenon proceeds. In FIG. 1, the tube 1, at the start of the operation, is partially filled in zone 4 with a carrier bearing a deposit of lime and partially filled in zone 5 with naked carrier with the zone 5 being situated downstream from zone 4, with respect to the direction of flow of the reaction mixture through the tube from a feed pipe 2 through which the reactants enter to an exit 3 from which the reaction products issue.

As the reaction proceeds, the lime travels along the carrier bed in the direction of flow of the reaction mixture. After a period of time, the system is as illustrated in FIG. 2 wherein zone 4 has traveled, progressively including zone 5, the length of which has diminished accordingly, while upstream of zone 4 a new zone 6 appears consisting of naked carrier freed of deposited lime which has been entrained by the reaction mixture and deposited downstream in the tube to constitute the new zone 4.

As the operation continues further, the system finally becomes as represented in FIG. 3 in which zone 4 has practically reached the outlet end of the tube 1, i.e. zone 5 has substantially completely disappeared. At this time and preferably before, the operation should be stopped, otherwise the mixture issuing from pipe 3 will contain entrained lime although the lime content of this mixture will be low, such as of the order of 30 mg. of Ca(OH)$_2$ per liter. If the mixture is subjected as such to distillation, the lime concentrates therein and causes destruction of some of the methoxy aldehyde. If the lime containing mixture is neutralized before distillation, a salt is formed which, during the distillation, also causes destruction of some of the desired methoxy aldehyde, although less rapidly than lime. Accordingly to free the liquid mixture from entrained lime, it is desirable to pass the mixture over and through an adsorbing carrier bed. This results in the lime bed progressively leaving tube 1. This operating procedure is applicable, in actual practice, only to instances in which it is intended to produce a limited amount of methoxy aldehyde. The limit of the operation is determined by the time necessary for the system to pass from the configuration illustrated in FIG. 1 to that illustrated in FIG. 3.

However, if it is desired to continue the operation, it is possible to invert the tube 1 whereby the system assumes the configuration illustrated in FIG. 4 which is identical to that illustrated in FIG. 1. This procedure involves the inconvenience of long interruption of the operation since, after stopping the flow of liquid reactants, tube 1 has to be removed to be inverted.

A more convenient procedure, which permits realization of a continuous operation over an extended period of time, consists in reversing the direction of the flow of reactants passing through the tube instead of inverting the tube. For this purpose, use may be made of a system as represented in FIG. 5.

The apparatus of FIG. 5 comprises a reaction tube 7 provided at its opposite ends with pipes 8 and 9 for entry or issuance of reaction mixture, at its central portion with a pipe 10 for introduction of lime wash, and at various levels with pipes 11 provided with stop cocks 12 for withdrawing samples of reaction liquid, such as for the measurement of the pH thereof. Tube 7 is also provided with two temperature controllers, such as thermometers 13 and 13'.

Preferably, if tube 7 is of large cross-section, the end of pipe 10 which communicates with tube 7 should be provided with a device for distribution of the incoming liquid, such as a distribution ring or crown. The same applies to the ends of pipes 8 and 9 which communicate with the opposite ends of the tube 7.

Two pipes 14 and 15, communicating with pipe 8, are provided with valves 16 and 17 respectively, while the two pipes 18 and 19, communicating with pipe 9, are provided with valves 20 and 21. Pipes 14 and 18 serve alternatively to feed tube 7 with liquid mixtures of the reactants introduced into the apparatus via pipe 22. Correspondingly, pipes 19 and 15 serve to withdraw the reaction products from tube 7 via pipe 23.

The operation of this system is illustrated in FIGS. 6 and 7. FIG. 6 illustrates the state of the apparatus at the start of the reaction with zone 24 in tube 7 filled with carrier laden with lime. Zone 24 is represented as being located in the lower half of tube 7 but it will be obvious that the reaction may be initiated with zone 24 disposed in the upper half of the tube, provided that the flow of reaction mixture is reversed with respect to the following description.

Zone 24 is surmounted by zone 25 containing lime-free carrier. At the start, to form the lime-on-carrier zone 24, it is convenient to fill tube 7 with lime-free carrier followed by introduction of the lime wash through pipe 10. This will result in deposition of lime on the carrier grains in the lower half of the tube. The introduction of lime wash is stopped when zone 24 is suitably laden with lime. Preferably, especially if tube 7 has a large cross-section, a zone 26 is kept in the lower portion of the tube without lime on carrier. This zone 26 serves to distribute the liquid reaction mixture fed from pipe 8 throughout the cross-section of the tube. Zone 26 may contain, preferably at the bottom of tube 7, a device or a material for distributing liquid, such as a distributing ring or crown or a bed of Raschig rings.

Before feeding the reactants from pipe 22, valves 20 and 17 are closed so that the liquid mixture passes from pipe 22 through pipes 14 and 8 and then upwards through tube 7 from which it issues through pipe 9 and is withdrawn through pipes 19 and 23.

As the operation proceeds, the zone 24 progressively travels upwardly in tube 7. When the upper end of this zone has risen sufficiently, the direction of the liquid flow through tube 7 is reversed. For this purpose, the configuration of the contents of the tube as represented in FIG. 7, valves 20 and 17 are opened while valves 16 and 21 are closed, as shown in FIG. 7. The liquid mixture passes from pipe 22 through pipes 18 and 9 and then downwardly through tube 7 from which it issues through pipe 8 and is withdrawn through pipes 15 and 23..

When the contents of tube 7 are again as represented in FIG. 6, the direction of liquid flow is again reversed, etc.

Preferably the bed of lime-on-carrier is not permitted to reach the upper or the lower end of tube 7. It is preferred to maintain a safety zone, such as zone 26 in FIG. 6, or zone 25 in FIG. 7. Without such safety zone, a slight but undesirable entrainment of lime may occur in the liquid reaction products issuing from the reaction tube. When the liquid flow is reversed, the safety zone serves as a zone for distribution of the liquid introduced into the entire cross-section of the tube. Such liquid distributing zone, at the top as well as at the bottom of the tube, may contain liquid distributing device or material, as described above for zone 26 of FIG. 6. In practice, the safety zone may be several dozens of centimeters in height.

If the operation is continued over a long period of time, additional lime wash may be introduced via pipe 10 when the amount of lime present in the reaction tube begins to diminish due to neutralization of portions of the lime by traces of acid contained in the liquid substances fed to the tube.

It is desirable, though not essential, to operate under the following conditions when operating with an apparatus such as that of FIG. 5 or when operating with reversal of the reaction tube, or for a short time operation in which there is no need to turn over the tube or to reverse the direction of liquid flow.

Use can be made of a reaction tube in the form of a vertical cylinder having a height of 1 to 3 meters and an internal diameter within the range of 10 mm. to 2 meters. The reaction tube may be fabricated of ordinary steel. The zone of lime-on-carrier in a tube of the type described may have a height of 30 to 50 centimeters.

The reactant mixture introduced into the apparatus comprises essentially methanol containing 3–20% by weight and preferably 4–10% by weight of $\alpha,\beta$-olefinic aldehyde. As described above, the liquid is caused to flow through the reaction tube at a flow rate sufficient to provide a residence time of liquid mixture in the reaction tube within the range of 6 minutes to 2 hours and preferably within the range of 30 to 45 minutes. Under these conditions, 5–70% of the amount of olefinic aldehyde brought into play will be converted, with the major portion being converted to methoxy aldehyde. The yields are ordinarily above 90% and may even exceed 99%. The liquid mixture issuing from the reaction tube is neutral due to the re-deposition of entrained lime in the lime-free carrier zone located downstream of the lime-on-carrier zone.

The speed of travel of the lime-on-carrier zone through the tube will depend somewhat on the flow rate of the reaction mixture but is generally maintained to a level below 5 cm. per hour. If, after a time, the conversion rate begins to decrease, introduction is made into pipe 10 of a small amount of slaked lime wash dispersed throughout an organic liquid as previously described. In actual practice, one is generally led to add about 1 gram of lime per liter capacity of the reaction tube every 50 hours.

The reaction temperature depends somewhat upon the temperature of the entering liquid reactant mixture. It may vary within the range of 5° to 55° C. but is generally within the range of 25° to 35° C.

The following examples are given by way of illustration, but not by way of limitation, of the practice of this invention:

EXAMPLE 1

The operation is carried out in an apparatus of the type shown in FIG. 5. Tube 7 has a height of 1.5 meters and an internal diameter of 4 cm. It contains 1.7 liters of "Aerosil 380" (silica grains) having an average grain size of 3 mm. The lime-on-silica bed contained therein has a height of 50 cm.

The tube is fed with the following mixture in grams per hour at 28° C.:

Methanol _____ 1860
Methacrolein _____ 140

The following mixture, having a pH of 6.5 and a temperature of 31° C., is withdrawn, in grams per hour:

Methanol _____ 1841.5
Methacrolein _____ 98.5
$\beta$-Methoxy isobutyraldehyde _____ 59
High boiling by-products _____ 1

The high-boiling by-products are mainly polymers and dimethyl methyl methoxy glutaraldehyde.

The above results correspond to a conversion rate of methacrolein to methoxy isobutyraldehyde of 29% and a methoxy isobutyraldehyde yield of 97.7%.

The apparatus continues to give the same results after continuous operation for 500 hours. The direction of the liquid flow is reversed every 8 hours and there is injected via pipe 10, 1 gram of lime in the form of a lime wash every 48 hours.

EXAMPLE 2

The operation is carried out in the apparatus of Example 1.

Tube 7 is fed with the following mixture, in grams per hour, at 27° C.:

Methanol _____ 1910
Crotonaldehyde _____ 90

There is withdrawn from the tube, per hour, the following mixture which has a pH of 6.5 and a temperature of 31° C., in grams per hour:

Methanol _____ 1879
Crotonaldehyde _____ 22
$\beta$-Methoxy butyraldehyde _____ 98.5
High boiling by-products _____ 0.5

The conversion rate of crotonaldehyde to methoxy butyraldehyde is 75% and the methoxy butyraldehyde yield is 99.4%.

The other conditions of the operation are the same as in Example 1.

EXAMPLE 3

The operation is carried out in the apparatus of Example 1.

Tube 7 is fed with the following mixture, in grams per hour, at 30° C.:

Methanol _____ 1840
Ethacrolein _____ 160

There is withdrawn from the tube, per hour, the following mixture which has a pH of 6.5 and a temperature of 33° C., in grams per hour:

Methanol _____ 1832
Ethacrolein _____ 137.5
$\beta$-Methoxy 2-ethyl propionaldehyde _____ 29
High boiling by-products _____ 1.5

The conversion rate of ethacrolein to methoxy ethyl propionaldehyde is 13% and the methoxy ethyl propionaldehyde yield is 93.3%.

The other conditions of the operation are the same as in Example 1.

I claim:

1. The process for preparation of $\beta$-methoxy aldehyde by catalytic condensation of methanol with an $\alpha,\beta$-olefinic aldehyde having 4 to 5 carbon atoms comprising passing a liquid mixture of the reactants into contact with a solid fixed bed catalyst of slaked lime on an adsorbent carrier of silica.

2. The process as claimed in claim 1 in which the process is a continuous process.

3. The process as claimed in claim 2 in which additional lime wash is introduced to an intermediate portion of the reaction zone to compensate for losses of lime during the operation.

4. The process as claimed in claim 1 in which the reaction is carried out at ambient temperature.

5. The process as claimed in claim 1 in which the adsorbent carrier is in the form of grains having a grain size within the range of 0.5 to 10 mm. in maximum cross-section.

6. The process as claimed in claim 1 in which the adsorbent carrier is in the form of grains having a grain size within the range of 2 to 5 mm. in maximum cross-section.

7. The process as claimed in claim 1 in which the carrier is in the form of grains prepared by mixing the adsorbing carrier with an amount of water to produce a thick paste, drying the paste at a temperature of about 100° C., granulating the dried paste, and separating the grindings to collect grains of the desired grain size.

8. The process as claimed in claim 1 in which the silica has a specific surface area of at least 200 m.²/g.

9. The process as claimed in claim 1 in which the liquid reaction mixture brought into contact with the catalytic bed comprises methanol containing 3–20% by weight of the α,β-olefinic aldehyde.

10. The process as claimed in claim 1 in which the liquid reactant mixture brought into contact with the catalytic bed comprises methanol containing 4–10% by weight of the α,β-olefinic aldehyde.

11. The process as claimed in claim 1 in which the residence time for reaction of the liquid mixture in contact with the catalytic bed is within the range of 6 to 120 minutes.

12. The process as claimed in claim 1 in which the residence time for reaction of the liquid mixture in contact with the catalytic bed is within the range of 30 to 45 minutes.

13. The process as claimed in claim 1 in which the reaction is carried out at a temperature within the range of 5° to 55° C.

14. The process as claimed in claim 1 in which the reaction is carried out at a temperature within the range of 25° to 35° C.

15. The process as claimed in claim 1 in which the slaked lime is deposited on the adsorbent carrier by wetting the carrier with a slaked lime wash of calcium hydroxide dispersed in a lower alkanol.

16. The process as claimed in claim 15 in which the lower alkanol is methanol.

17. The process as claimed in claim 15 in which the calcium hydroxide content of the lime wash is within the range of 5–30% by weight.

18. The process for the preparation of β-methoxy aldehyde by catalytic condensation of methanol with an α,β-olefinic aldehyde containing 4 to 5 carbon atoms comprising passing a liquid reaction mixture of the aldehyde and the methanol into contact with a fixed bed catalyst of slaked lime on an adsorbent silica carrier contained in the reaction zone, with the reaction zone being formed of a first zone containing the catalyst and a carrier and a second zone, downstream of the first zone, containing adsorbent silica free of catalyst whereby catalyst eluted from the first zone is redeposited on the adsorbent silica in the second zone.

19. The process as claimed in claim 18 in which, when the downstream zone free of catalyst has been converted to a zone containing catalyst redeposited from the catalytic zone, the reaction zone is inverted whereby the catalyst zone now depleted of catalyst becomes the downstream zone which is relatively free of catalyst.

20. The process as claimed in claim 17 in which the reaction zone is inverted before the entire downstream zone is inverted to a catalytic zone to provide a safety zone free of catalyst at the exit end of the reaction zone.

21. The process as claimed in claim 18 in which, when the downstream zone free of catalyst has been inverted to a downstream zone containing catalyst redeposited from the catalytic zone, the direction of flow of liquid reactants through the reaction zone is reversed.

22. The process as claimed in claim 21 in which the direction of flow of the stream is reversed before the downstream zone is entirely inverted to provide a safety zone free of catalyst at the exit end of the reaction zone.

23. The process as claimed in claim 18 in which the lime wash is introduced to an intermediate portion of the reaction zone and controlling the direction of flow of the lime wash through the reaction zone to deposit lime on the carrier grain to one side of the inlet to provide a reaction zone containing catalyst and a downstream zone which is free of catalyst.

24. The process as claimed in claim 18 in which the reaction zone is in the form of a column having a diameter within the range of 10 mm. to 2 meters and a height within the range of 1 to 3 meters.

25. The process as claimed in claim 24 in which the catalytic bed has a height within the range of 30 to 50 cm.

References Cited

UNITED STATES PATENTS

| | | | |
|---|---|---|---|
| 3,077,500 | 2/1963 | Heinz et al. | 260—602 |
| 2,704,298 | 3/1955 | Bellringer et al. | 260—602 |
| 2,600,275 | 6/1952 | Smith | 260—602 |

FOREIGN PATENTS

| | | | |
|---|---|---|---|
| 1,205,463 | 9/1970 | Great Britain | 260—602 |
| 448,125 | 6/1936 | Great Britain | 260—60 Z X |

BERNARD HELFIN, Primary Examiner

D. B. SPRINGER, Assistant Examiner

U.S. Cl. X.R.

252—457